(12) United States Patent
Singh et al.

(10) Patent No.: US 8,832,666 B2
(45) Date of Patent: Sep. 9, 2014

(54) DYNAMIC INSTRUMENTATION

(75) Inventors: Balbir Singh, Bangalore (IN); Maneesh Soni, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1220 days.

(21) Appl. No.: 12/642,973

(22) Filed: Dec. 21, 2009

(65) Prior Publication Data

US 2011/0154297 A1 Jun. 23, 2011

(51) Int. Cl.
*G06F 9/44* (2006.01)

(52) U.S. Cl.
USPC .......................................... 717/130

(58) Field of Classification Search
None
See application file for complete search history.

(56) References Cited

U.S. PATENT DOCUMENTS

| | | | | |
|---|---|---|---|---|
| 6,499,137 | B1 * | 12/2002 | Hunt | 717/164 |
| 6,898,785 | B2 | 5/2005 | Ramasamy et al. | |
| 6,931,632 | B2 | 8/2005 | Ramasamy et al. | |
| 7,523,446 | B2 * | 4/2009 | Keniston | 717/129 |
| 8,286,139 | B2 * | 10/2012 | Jones et al. | 717/128 |
| 2004/0205720 | A1 * | 10/2004 | Hundt | 717/124 |
| 2004/0221278 | A1 * | 11/2004 | Dankel et al. | 717/139 |
| 2005/0108562 | A1 * | 5/2005 | Khazan et al. | 713/200 |
| 2007/0168979 | A1 | 7/2007 | Kumar et al. | |
| 2008/0127117 | A1 | 5/2008 | Panchamukhi et al. | |
| 2008/0133896 | A1 * | 6/2008 | Keniston | 712/227 |
| 2010/0095281 | A1 * | 4/2010 | Raber | 717/129 |
| 2012/0216015 | A1 * | 8/2012 | Mitra | 712/28 |

OTHER PUBLICATIONS

Ramasamy et al., "Dynamic Binary Instrumentation on IA-64", EPICI Workshop, MICRO34, Dec. 1-5, 2001, Austin Texas: http://www.cs.tufts.edu/comp/150PAT/tools/caliper/epic1.pdf.

Keniston et al., "Ptrace, Utrace, Uprobes: Lightweight, Dynamic Tracing of User Apps", Proceedings of the Linux Symposium, vol. One, Juan 27-30th, 2007, Ottawa, Ontario, Canada: http://www.kernel.org/doc/ols/2007/ols2007v1-pages-215-224.pdf.

Mavinakayanahalli et al. "Probing the Guts of Kprobes" , Proceedings of the Linux Symposium, vol. Two, Jul. 19-22, 2006, Ottawa, Ontario, Canada: http://www.kernel.org/doc/ols/2006/ols2006v2-pages-109-124.pdf.

Bryan M. Cantrill , Michael W. Shapiro , Adam H. Leventhal, Dynamic instrumentation of production systems, Proceedings of the annual conference on USENIX Annual Technical Conference, Jun. 27-Jul. 2, 2004, Boston, MA. http://www.usenix.org/events/usenix04/tech/general/full_papers/cantrill/cantrill.pdf.

(Continued)

*Primary Examiner* — Li B Zhen
*Assistant Examiner* — Evral Bodden
(74) *Attorney, Agent, or Firm* — The Steadman Law Firm PLLC; Cynthia G. Seal; Katherine S. Brown

(57) ABSTRACT

A method and system for instrumentation are provided along with a method for instrumentation preparation. The method for instrumentation preparation may comprise obtaining address data of an original instruction in an original instruction stream, obtaining kernel mode data comprising a kernel breakpoint handler, obtaining user mode data comprising a user breakpoint handler, allocating a page of a process address space, creating a trampoline, associating the trampoline with a breakpoint instruction, and replacing the original instruction with the breakpoint instruction. The method for instrumentation may comprise detecting the breakpoint instruction, calling the kernel breakpoint handler, modifying an instruction pointer via the kernel breakpoint handler such that the instruction pointer points to the trampoline, and executing the trampoline. The system for instrumentation may comprise a breakpoint setup module and a breakpoint execution module for respectively setting up and completing instrumentation involving the trampoline.

20 Claims, 6 Drawing Sheets

(56) References Cited

OTHER PUBLICATIONS

N. Nethercote. Dynamic Binary Analysis and Instrumentation. PhD thesis, University of Cambridge, United Kingdom, Nov. 2004. http://www.cl.cam.ac.uk/techreports/UCAM-CL-TR-606.pdf.

Dyninst Programmer's Guide. Release 6.1. Nov. 2009. Computer Science Department, University of Wisconsin-Madison. Madison, WI. Computer Science Department, University of Maryland. College Park, MD ftp://ftp.cs.wisc.edu/paradyn/releases/release6.1/doc/dyninstProgGuide.v61.pdf.

* cited by examiner

DYNAMIC INSTRUMENTATION

BACKGROUND

Dynamic instrumentation of software (e.g., a computer program), is used to collect data (e.g., performance data) with respect to the software without recompiling or rebuilding the software. The collected data, generally may be used to solve deep-rooted problems such as deadlocks, resource contention, memory leaks, etc. In typical computer based systems implementing a kernel mode and a user mode, it is useful to collect data from the kernel mode as well as from the user mode with low overhead. Accordingly, there is a need for dynamic instrumentation solutions that achieve data collection involving both the kernel mode and the user mode with low overhead.

SUMMARY

Dynamic instrumentation involving both the user mode and the user mode may be achieved via instrumentation solutions involving a trampoline. Such instrumentation solutions are disclosed in accordance with the various embodiments described herein. In accordance with these various embodiments, data collection via instrumentation can be achieved with low overhead.

In accordance with a first aspect of the various embodiments described herein, a method for instrumentation preparation is provided. This method involves setting up a breakpoint in preparation for instrumentation. The method may comprise obtaining address data of an original instruction in an original instruction stream, obtaining kernel mode data comprising a kernel breakpoint handler, obtaining user mode data comprising a user breakpoint handler, allocating a page of a process address space, creating a trampoline, associating the trampoline with a breakpoint instruction, and replacing the original instruction with the breakpoint instruction. The method further may comprise storing the trampoline in the page and copying the user breakpoint handler to the page.

The trampoline created in accordance with this method may comprise at least one of a copy of the original instruction, a set of instructions for saving register states and stack data of the original instruction, a set of instructions for performing a call to the user breakpoint handler, a set of instructions for restoring the register states and the stack data of the original instruction, and a set of instructions for performing a jump to the next instruction following the original instruction in the original instruction stream. Moreover, the method step of allocating the page may comprise mapping the page to the process address space. Furthermore, the method step of associating the trampoline with the breakpoint instruction may comprise registering the kernel breakpoint handler.

In accordance with a second aspect of the various embodiments described herein, a method for instrumentation is provided. The method may comprise detecting a breakpoint instruction, calling a kernel breakpoint handler, modifying an instruction pointer via the kernel breakpoint handler such that the instruction pointer points to a trampoline associated with the breakpoint instruction, and executing the trampoline. The trampoline may comprise a copy of an original instruction in an original instruction stream.

Executing the trampoline in accordance with this method may comprise executing the original instruction. Moreover, executing the trampoline may comprise at least one of saving register states and a thread stack of the original instruction and restoring the register states and the thread stack of the original instruction. Furthermore, executing the trampoline may comprise jumping to the next instruction following the original instruction in the original instruction stream.

In accordance with a third aspect of the various embodiments described herein, a system for instrumentation is provided. The system may comprise a breakpoint setup module for allocating memory of a process address space, for configuring instrumentation data associated with an original instruction in an original instruction stream, for storing the instrumentation data in the allocated memory of the process address space, and for associating the instrumentation data with a breakpoint instruction. In addition, the system may comprise a breakpoint execution module for executing a kernel breakpoint handler that modifies an instruction pointer to point to the instrumentation data and for executing the instrumentation data. The instrumentation data may comprise a trampoline. The trampoline may comprise at least one of a copy of the original instruction, a set of instructions for saving register states and stack data of the original instruction, a set of instructions for performing a call to a user breakpoint module, a set of instructions for restoring the register states and the stack data of the original instruction, and a set of instructions for performing a jump to the next instruction following the original instruction in the original instruction stream.

Moreover, in accordance with this system, the breakpoint setup module may store at least one of a user breakpoint handler and user mode instructions in the allocated memory of the process address space. Additionally, the breakpoint setup module may associate the instrumentation data with the breakpoint instruction by registering a kernel breakpoint handler. The kernel breakpoint handler may modify the instruction pointer to point to the instrumentation data. Furthermore, the breakpoint setup module may allocate memory of the process address space by mapping a page to the process address space.

In accordance with a fourth aspect of the various embodiments described herein, a computer program product for instrumentation preparation is provided. The computer program product involves setting up a breakpoint in preparation for instrumentation. The computer program product may comprise a computer readable storage medium having computer readable program code instructions stored therein that may comprise sets of computer instructions for performing one or more steps of the aforementioned instrumentation preparation method.

In accordance with a fifth aspect of the various embodiments described herein, a computer program product for instrumentation is provided. The computer program product may comprise a computer readable storage medium having computer readable program code instructions stored therein that may comprise sets of computer instructions for performing one or more steps of the aforementioned instrumentation method.

BRIEF DESCRIPTION OF THE DRAWINGS

The various embodiments described herein will be described in detail with reference to the following figures, wherein.

The drawings described herein are for illustration purposes only and are not intended to limit the scope of the present disclosure in any way. Throughout the drawings, corresponding reference numerals indicate like or corresponding parts and features.

DETAILED DESCRIPTION

Figure 1:
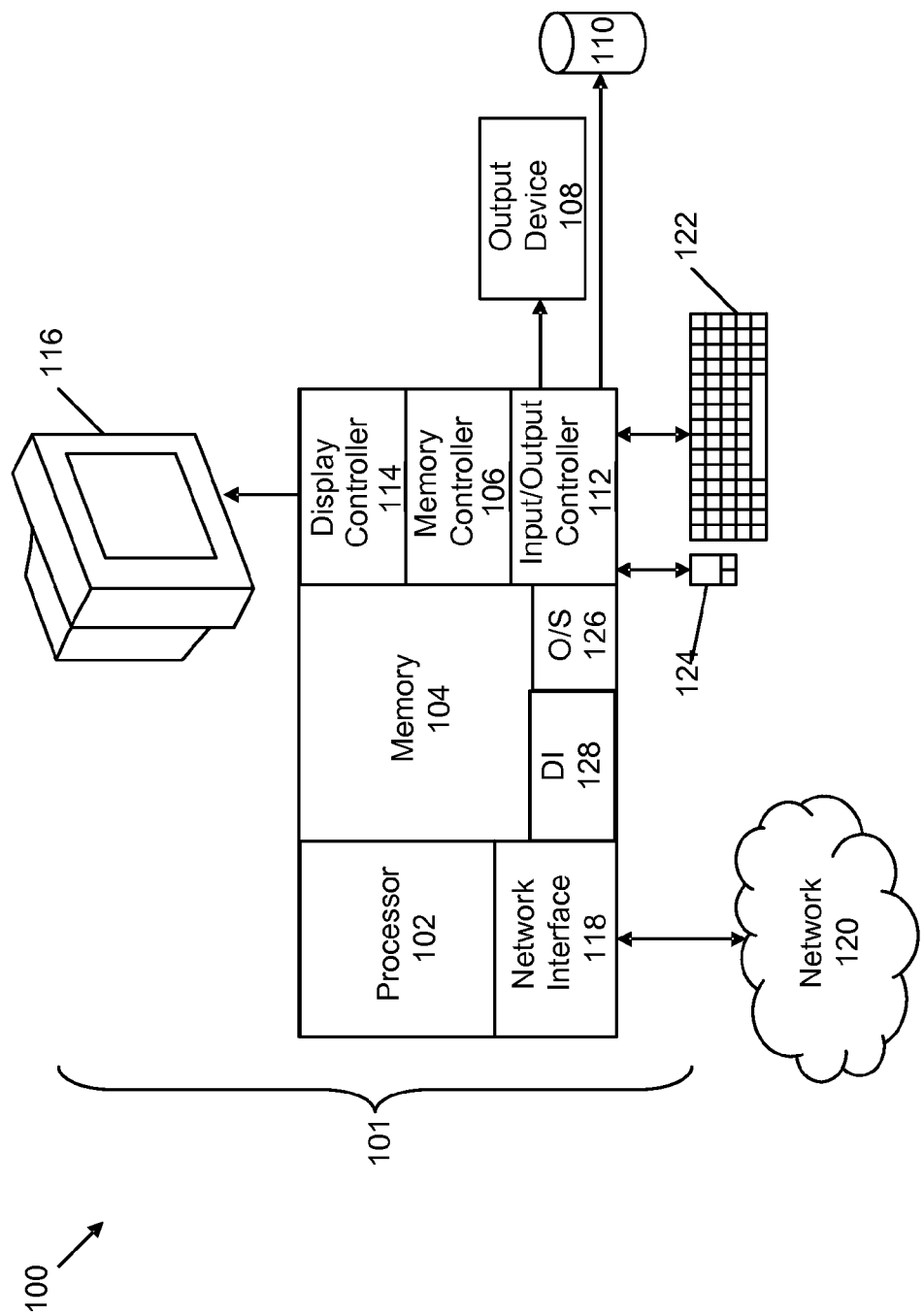
FIG. 1 is a block diagram illustrating a computing system comprising a dynamic instrumentation system in accordance with an exemplary embodiment.

Reference will now be made in detail to the subject matter disclosed, which is illustrated in the accompanying drawings. It will be readily understood that the components of the various embodiments as generally described and illustrated in the figures herein may be arranged and designed in a wide variety of different configurations in addition to the described exemplary embodiments. Thus, the following detailed description of the various embodiments, as represented in the figures, is not intended to limit the scope of the disclosure as claimed but rather is merely representative of the various embodiments.

Furthermore, the described features, structures, or characteristics may be combined in any suitable manner in one or more embodiments. In the following description, numerous specific details are provided to give a thorough understanding of embodiments of the invention. However, one skilled in the relevant art will recognize that the various embodiments can be practiced without one or more of the specific details and/or can be practiced with other methods, components, materials, etc. In other instances, well-known structures, materials, or operations are not shown or described in detail to avoid obscuring aspects of the various embodiments. The various embodiments described herein will be best understood by reference to the drawings. The following description is intended only by way of example and simply illustrates certain selected exemplary embodiments as claimed herein.

The flowchart and block diagrams in the drawings illustrate the architecture, functionality, and operation of possible implementations of systems, methods, and computer program products in accordance with various embodiments. In this regard, each block in the drawings may represent a module, segment, or portion of code, which comprises one or more executable instructions for implementing the specified logical function(s). It should also be noted that, in some alternative implementations, the functions noted in the block may occur out of the order noted in the drawings. For example, two blocks shown in succession may be executed substantially concurrently, or the blocks sometimes may be executed in the reverse order, depending upon the functionality involved. Moreover, each block of the block diagrams and/or flowchart illustrations, and combinations of blocks in the block diagrams and/or flowchart illustrations, may be implemented by special purpose hardware-based systems that perform the specified functions or acts or by combinations of special purpose hardware and computer instructions.

FIG. 1 provides a block diagram of an exemplary computing system 100 that comprises a dynamic instrumentation system in accordance with an exemplary embodiment. The computing system 100 may comprise a general purpose computer 101. As can be appreciated, the computing system 100 may comprise a number of computing devices, including but not limited to a desktop computer, a laptop, a server, a portable handheld device (e.g., a PDA, a mobile phone, etc.), or any other electronic device capable of performing computation. The various embodiments described herein will be discussed in the context of the general purpose computer 101.

The computer 101 may comprise a processor 102, memory 104 coupled to a memory controller 106, one or more input and/or output (I/O) devices 108, 110 (or peripherals) that are communicatively coupled via a local input/output controller 112, and a display controller 114 coupled to a display 116. A conventional keyboard 122 and mouse 124 may be coupled to the input/output controller 112. Furthermore, the computing system 100 may comprise a network interface 118 for coupling the computing system 100 to a network 120. The network 120 may transmit and receive data between the computer 101 and external systems.

The memory 104 may store instructions that can be executed by the processor 102. The instructions stored in memory 104 may comprise one or more separate programs, each of which may comprise an ordered listing of executable instructions for implementing logical functions. As illustrated in FIG. 1, the instructions stored in the memory 104 may comprise a suitable operating system (OS) 126. The operating system 126 may control the execution of other computer programs and may provide scheduling, input-output control, file and data management, memory management, and communication control and related services.

The processor 102 may be configured to execute the instructions stored within the memory 104, to communicate data to and from the memory 104, and to generally control operations of the computer 101 pursuant to the instructions when the computer 101 is in operation. The processor 102 may be any custom made or commercially available processor, a central processing unit (CPU), an auxiliary processor among several processors associated with the computer 101, a semiconductor based microprocessor (in the form of a microchip or chip set), a microprocessor, or any other device for executing instructions.

The processor 102 may execute the instructions of a dynamic instrumentation system 128. The dynamic instrumentation system 128 may be stored in the memory 104 (as shown in FIG. 1), may be executed from a portable storage device (e.g., CD-ROM, Diskette, FlashDrive, etc.) (not shown), and/or may be run from a remote location, such as from a central server (not shown).

Generally, the dynamic instrumentation system 128 may collect data (e.g., performance data of a program of the computer 101). Such data may be collected from a kernel address space (while running in the kernel mode) and a user address space. The dynamic instrumentation system 128 may collect the data non-disruptively and without recompiling or rebuilding the application.

Figure 2:
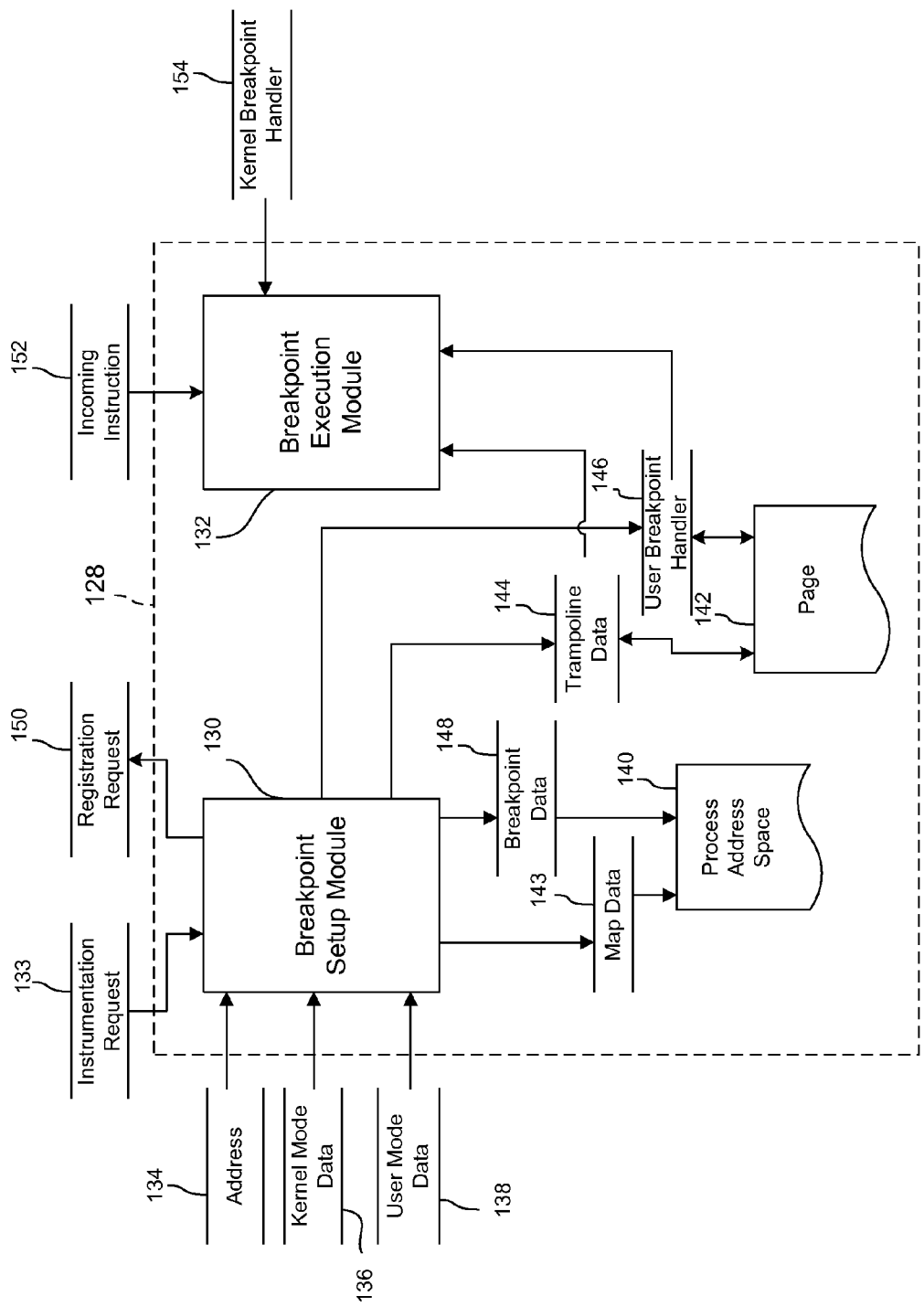
FIG. 2 is a dataflow diagram illustrating the dynamic instrumentation system of FIG. 1 in further detail in accordance with an exemplary embodiment.

FIG. 2 illustrates the dynamic instrumentation system 128 in further detail in accordance with an exemplary embodiment. The dynamic instrumentation system 128 may comprise one or more modules and data stores. As can be appreciated, the modules may be implemented as a combination of software, hardware, firmware, and/or other suitable components that provide the described functionality. Moreover, the modules shown in FIG. 2 may be combined and/or further partitioned to similarly collect data from the kernel address space and the user address space. In this example, the dynamic instrumentation system 128 comprises a breakpoint setup module 130 and a breakpoint execution module 132.

The breakpoint setup module 130 may receive as inputs an instrumentation request 133, address data 134, kernel mode data 136, and user mode data 138. The instrumentation request 133 may be generated based on a user request to instrument an original instruction stream (e.g., a program) with a breakpoint. The address data 134 may comprise the text address of an original instruction within the original instruction stream. The kernel mode data 136 may comprise a kernel breakpoint handler 154 (which may be an input to the breakpoint execution module 132, as illustrated in FIG. 2 and discussed below) or kernel instrumentation codes that are executed in the kernel mode. The user mode data 138 may comprise a user breakpoint handler 146 (which may be an input to the breakpoint execution module 132, as illustrated in FIG. 2 and discussed below) or user instrumentation codes that are generally executed in the user mode. Based on the inputs, the breakpoint setup module 130 may configure the original instruction stream by inserting a breakpoint instruction.

The breakpoint setup module 130 may interface with a process address space 140 associated with the address data 134. The process address space 140 generally stores code, data, and a stack. When the instrumentation request 133 is received, the breakpoint setup module 130 may allocate a page 142 of the process address space 140 to store breakpoint instrumentation information. The allocation of the page 142 of the process address space may be achieved by mapping the page 142 to the process address space 140, and such mapping may be facilitated via map data 143. The breakpoint setup module 130 may store in the page 142 the user mode data 138 and trampoline data 144 representing a trampoline.

The trampoline data 144 may comprise a copy of the original instruction (Original_Instruction_Copy), a set of one or more instructions for saving register states and stack data of the original instruction (Save_Registers( )), a set of one or more instructions for performing a call to the user breakpoint handler 146 (Call_User_Breakpoint_Handler( )), a set of one or more instructions for restoring the register states and the stack data of the original instruction ((Restore_Registers( )), and a set of one or more instructions for performing a jump to the next instruction following the original instruction in the original instruction stream (Jump_Next_Instruction). The breakpoint setup module 130 may define the trampoline data 144 based on the instruction data stored in the process address space 140.

The breakpoint setup module 130 may replace the original instruction with the breakpoint instruction via breakpoint data 148. Moreover, the breakpoint setup module 130 may generate a registration request 150 to register the kernel breakpoint handler 154 for the breakpoint instruction. The registration of the kernel breakpoint handler 154 may associate the trampoline data 144 and other kernel mode data 136 with the breakpoint instruction.

The breakpoint execution module 132 may receive as inputs an incoming instruction 152, the kernel breakpoint handler 154, the trampoline data 144, and the user breakpoint handler 146. The incoming instruction 152 indicates the instruction to be processed. When the incoming instruction 152 is a breakpoint instruction, the breakpoint execution module 132 may execute the kernel breakpoint handler 154 that is registered for the breakpoint instruction.

The kernel breakpoint handler 154 may modify an instruction pointer to point to the trampoline in the page 142 of the process address space 140. The kernel breakpoint handler 154 may return after modifying the instruction pointer. The breakpoint execution module 132 then may execute the trampoline by, for example, saving the register states and the stack data of the original instruction, executing the user breakpoint handler 146, restoring the register states and the stack data of the original instruction, executing the original instruction, and jumping to the next instruction following the original instruction in the original instruction stream.

With reference to FIGS. 3-6 and with continued reference to FIG. 2, methods will be described that can be performed by the dynamic instrumentation system 128 of FIG. 2 in accordance with an exemplary embodiment. The methods may involve an original instruction in an original instruction stream. As can be appreciated in light of the disclosure, the order of operation within the methods is not limited to the sequential execution as illustrated in FIGS. 3-6, but rather may be performed in one or more varying orders as applicable and in accordance with the present disclosure. Furthermore, one or more steps of the methods may be added or removed without altering the spirit of the methods.

Figure 3:
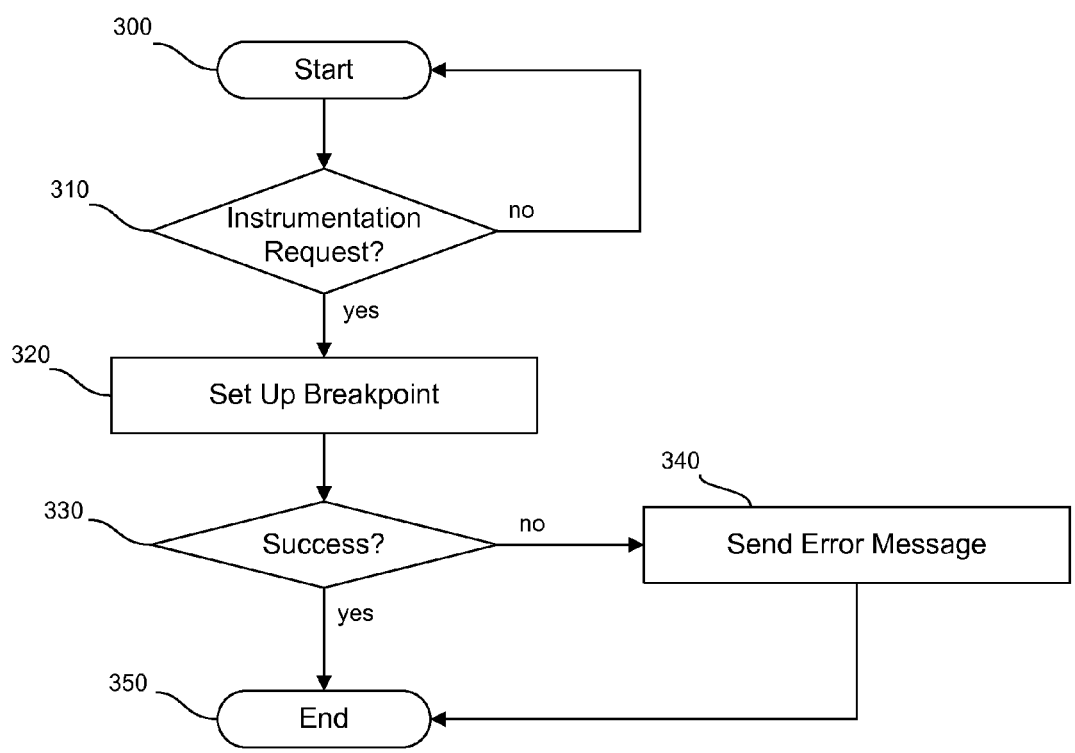
FIG. 3 is a flowchart illustrating a method that can be performed by the dynamic instrumentation system of FIG. 2 in order to prepare for instrumentation in accordance with an exemplary embodiment.

FIG. 3 illustrates a method that can be performed by the dynamic instrumentation system 128 of FIG. 2 in order to prepare for instrumentation involving the original instruction in accordance with an exemplary embodiment. The process may begin at block 300. The inputs may be monitored for an instrumentation request, and at block 310 it may be determined whether an instrumentation request has been received. When an instrumentation request is received at block 310, a breakpoint may be set up at block 320, as will be further discussed herein in the context of FIG. 4. Subsequently, it may be determined at block 330 whether the breakpoint setup is successful. If the breakpoint setup is successful, then the process may end at block 350. Conversely, if the breakpoint setup is not successful, then an error message may be sent (e.g., sent to the user) at block 340 before the process ends at block 350. Once the process ends, subsequent instructions in the original instruction stream may be processed in accordance with an instrumentation method further discussed herein in the context of FIG. 5.

Figure 4:
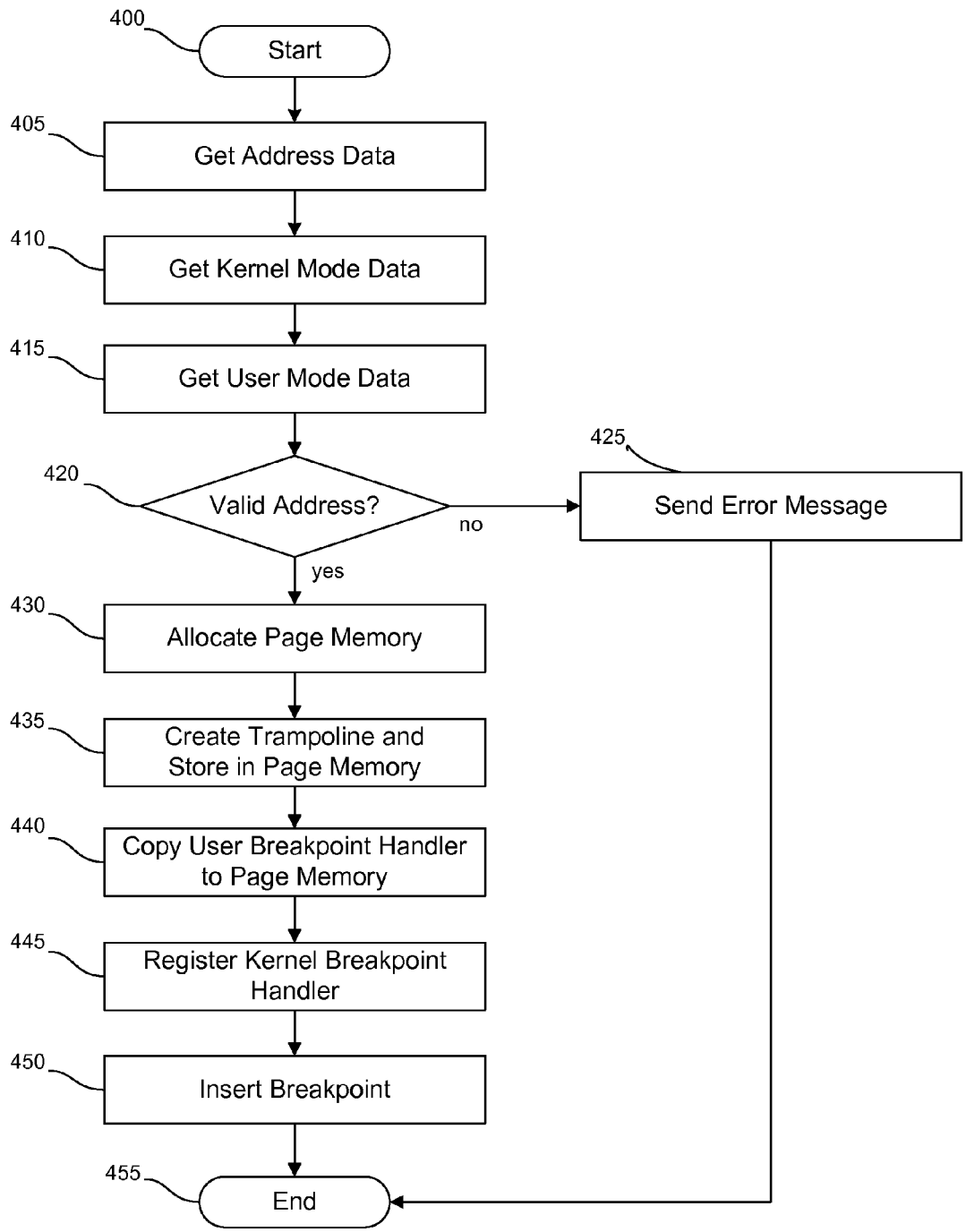
FIG. 4 is a flowchart illustrating a breakpoint setup method that can be performed by the dynamic instrumentation system of FIG. 2 in accordance with an exemplary embodiment.

FIG. 4 illustrates a breakpoint setup method that may be performed by the breakpoint setup module 130 of FIG. 2 in accordance with an exemplary embodiment. The process steps performed in accordance with this method further define the breakpoint setup step previously presented with respect to block 320 of the method illustrated in FIG. 3. The process may begin at block 400. The address data (text address) 134 of the original instruction may be obtained at block 405, the kernel mode data 136 may be obtained at block 410, and the user mode data 138 may be obtained at block 415. At block 420 it may be determined whether the obtained address data 134 is valid. If it is determined that the obtained address data 134 is invalid, then an error message may be sent (e.g., sent to the user) at block 425, and the process then may end at block 455. Conversely, if it is determined that the obtained address data 134 is valid, then at block 430 additional memory of the process address space 140 may be allocated in the form of the page 142. The memory allocation may be achieved by mapping the page 142 to the process address space 140. Subsequently, a trampoline may be created and stored in the page 142 at block 435. As previously discussed with reference to FIG. 2, the trampoline may be represented by the trampoline data 144 and may comprise a copy of the original instruction. The user breakpoint handler 146 may be copied to the page 142 at block 440. The kernel breakpoint handler 154 may be registered at block 445, and a breakpoint (i.e., breakpoint instruction) may be inserted at block 450. As previously mentioned, the registration of the kernel breakpoint handler 154 may associate the trampoline data 144 with the breakpoint instruction. The inserted breakpoint instruction may replace the original instruction. Thereafter, the process may end at block 455. It should be noted that an existing breakpoint may be removed as desired using a process analogous to the process described above.

Figure 5:
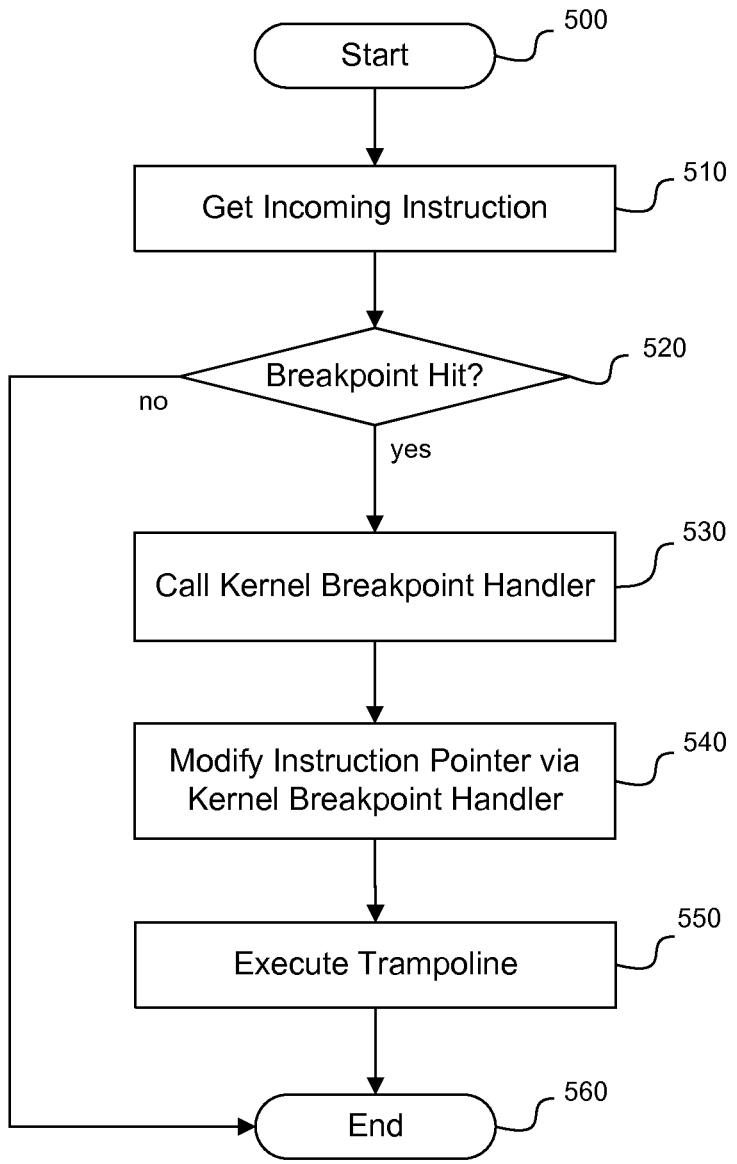
FIG. 5 is a flowchart illustrating an instrumentation method that can be performed by the dynamic instrumentation system of FIG. 2 in accordance with an exemplary embodiment.

FIG. 5 illustrates an instrumentation method in accordance with an exemplary embodiment. The process may begin at block 500. An incoming instruction 152 in the original instruction stream may be received at block 510. Then, it may be determined whether the incoming instruction 152 is a breakpoint instruction at block 520. That is to say, it may be determined whether a breakpoint hit that causes a breakpoint exception has occurred. If at block 520 it is determined that the incoming instruction 152 is not a breakpoint instruction (i.e., there is no breakpoint hit), then the process may end at block 560. Conversely, if it is determined that the incoming instruction 152 is a breakpoint instruction (i.e., there is a breakpoint hit), then the kernel breakpoint handler 154 may be called at block 530 in order to handle the breakpoint exception. At block 540, the value of the instruction pointer may be modified by means of the kernel breakpoint handler 154 to point to the trampoline stored in the page 142 that is mapped to the process address space 140. Subsequently, the trampoline may be executed at block 550, as will be further discussed herein in the context of FIG. 6. Thereafter, the process may end at block 560.

Figure 6:
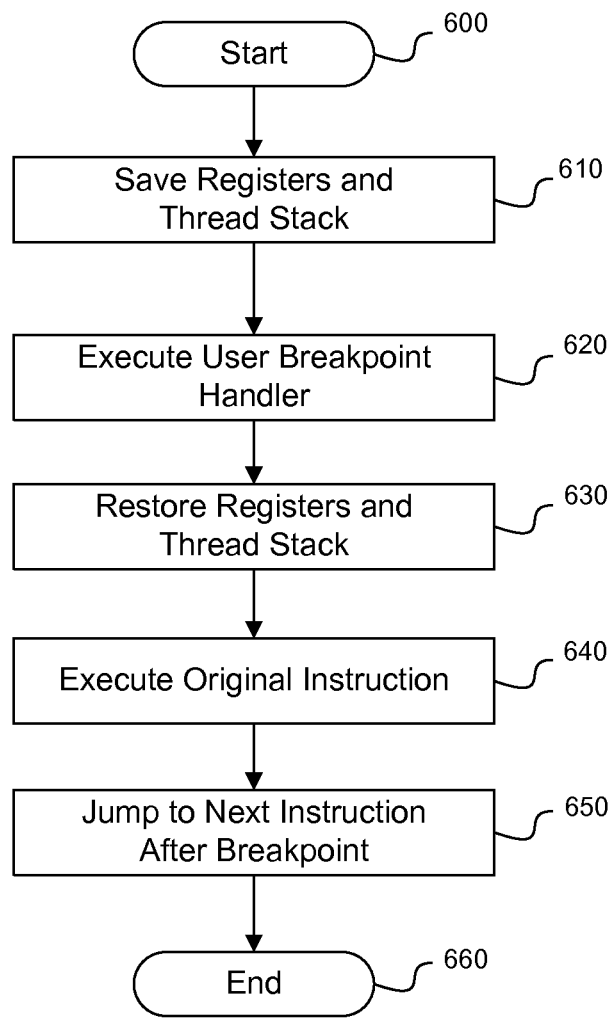
FIG. 6 is a flowchart illustrating a trampoline execution method that can be performed by the dynamic instrumentation system of FIG. 2 in accordance with an exemplary embodiment.

FIG. 6 illustrates a trampoline execution method that may be performed by the breakpoint execution module 132 of FIG. 2 in accordance with an exemplary embodiment. The process steps performed in accordance with this method further define the trampoline execution step previously presented with respect to block 550 of the instrumentation method illustrated in FIG. 5. The process may begin at block 600. The trampoline may save the registers (including the register states) and the thread stack of the original instruction at block 610. The trampoline may execute the user breakpoint handler at block 620. Once the user breakpoint handler is executed, the trampoline may restore the registers and the thread stack of the original instruction at process block 630. Subsequently, the trampoline may execute the original instruction at block 640 and then may jump to the next instruction after the breakpoint instruction (i.e., the next instruction following the original instruction in the original instruction stream) at block 650. Thereafter, the process may end at block 660.

One or more aspects of the various embodiments described herein may be included in an article of manufacture (e.g., one or more computer program products) comprising a computer readable medium. The computer readable medium may comprise computer readable program code for providing and facilitating the capabilities of the present disclosure. The article of manufacture may be included as a part of a computer system or may be provided separately. Additionally, at least one program storage device readable by a machine, tangibly embodying at least one program of instructions executable by the machine to perform the capabilities of the present disclosure, may be provided.

A computer usable or computer readable medium may be utilized, or any combination of computer usable or computer readable media may be utilized. The computer usable or computer readable medium may be, for example, an electronic, magnetic, optical, electromagnetic, infrared, or semiconductor system, apparatus, device, or propagation medium. More specific examples (a non-exhaustive list) of the computer readable medium include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer usable or computer readable medium may be paper or another suitable medium upon which the program is printed, as the program may be electronically captured, via, for instance, optical scanning of the paper or other medium, then compiled, interpreted, or otherwise processed in a suitable manner, if necessary, and then stored in a computer memory. In the context of this disclosure, a computer usable or computer readable medium may be any medium that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the various embodiments described herein may be written in any combination of one or more programming languages, including an object oriented programming language such as Java, Smalltalk, C++, or the like and conventional procedural programming languages, such as the "C" programming language or similar programming languages. The program code may execute entirely on a user's computer, partly on a user's computer, as a stand-alone software package, partly on a user's computer and partly on a remote computer, or entirely on the remote computer or server. In the latter scenario, the remote computer may be connected to a user's computer through any type of network, including a local area network (LAN) or a wide area network (WAN), or the connection may be made to an external computer (for example, through the Internet using an Internet Service Provider).

While exemplary embodiments have been described herein, it should be understood that those skilled in the art, both now and in the future, may make various improvements and enhancements which fall within the scope of the claims which follow. These claims should be construed to maintain the proper protection for the disclosure first described.

The terminology used herein is for the purpose of describing particular embodiments only and is not intended to be limiting of the invention. As used herein, the singular forms "a", "an" and "the" are intended to include the plural forms as well, unless the context clearly indicates otherwise. The corresponding structures, features, materials, acts, and equivalents of all means or step plus function elements in the claims below are intended to include any structure, material, or act for performing the function in combination with other claimed elements as specifically claimed. The disclosure has been presented for purposes of illustration and description, but is not intended to be exhaustive or limited to the various embodiments in the form disclosed. Many modifications and variations will be apparent to those of ordinary skill in the art without departing from the scope and spirit of the various embodiments. The exemplary embodiments have been chosen and described in order to best explain the principles of the various embodiments and the practical application, and to enable others of ordinary skill in the art to understand the various embodiments. The various embodiments may include various modifications as are suited to the particular use contemplated.

What is claimed is:

1. A method comprising:
obtaining address data of an original instruction in an original instruction stream;
obtaining kernel mode data comprising a kernel breakpoint handler;
obtaining user mode data comprising a user breakpoint handler;
creating a trampoline comprising a copy of the original instruction, a set of instructions for performing a call to the user breakpoint handler, a set of instructions for saving register states and stack data of the original instruction, and a set of instructions for restoring the register states and the stack data of the original instruction;
registering the kernel breakpoint handler to associate the trampoline with a breakpoint instruction;
replacing the original instruction with the breakpoint instruction;
detecting the breakpoint instruction; and
subsequent to detecting the breakpoint instruction, executing the trampoline by operation of one or more processors, wherein executing the trampoline comprises executing the original instruction.

2. The method according to claim 1, further comprising:
allocating a page of a process address space;
storing the trampoline in the page; and
copying the user breakpoint handler to the page.

3. The method according to claim 1, wherein the trampoline further comprises a set of instructions for performing a jump to a next instruction following the original instruction in the original instruction stream.

4. The method according to claim 2, wherein allocating the page comprises mapping the page to the process address space.

5. The method according to claim 1, wherein executing the trampoline further comprises at least one of saving the register states and the stack data of the original instruction and restoring the register states and the stack data of the original instruction.

6. The method according to claim 1, wherein executing the trampoline further comprises jumping to a next instruction following the original instruction in the original instruction stream.

7. The method according to claim 1, further comprising:
calling the kernel breakpoint handler; and
modifying an instruction pointer via the kernel breakpoint handler such that the instruction pointer points to the trampoline.

8. A computer program product including a non-transitory computer readable medium having program code instructions embodied therewith, the program code instructions executable by a computing device to perform an operation comprising:
obtaining address data of an original instruction in an original instruction stream;
obtaining kernel mode data comprising a kernel breakpoint handler;
obtaining user mode data comprising a user breakpoint handler;
creating a trampoline comprising a copy of the original instruction, a set of instructions for performing a call to the user breakpoint handler, a set of instructions for saving register states and stack data of the original instruction, and a set of instructions for restoring the register states and the stack data of the original instruction;
registering the kernel breakpoint handler to associate the trampoline with a breakpoint instruction;
replacing the original instruction with the breakpoint instruction;
detecting the breakpoint instruction; and
subsequent to detecting the breakpoint instruction, executing the trampoline by operation of one or more processors, wherein executing the trampoline comprises executing the original instruction.

9. The computer program product according to claim 8, wherein the operation further comprises:
allocating a page of a process address space;
storing the trampoline in the page; and
copying the user breakpoint handler to the page.

10. The computer program product according to claim 8, wherein the trampoline further comprises a set of instructions for performing a jump to a next instruction following the original instruction in the original instruction stream.

11. The computer program product according to claim 9, wherein allocating the page comprises mapping the page to the process address space.

12. The computer program product according to claim 8, wherein executing the trampoline further comprises at least one of saving the register states and the stack data of the original instruction and restoring the register states and the stack data of the original instruction.

13. The computer program product according to claim 8, wherein executing the trampoline further comprises jumping to a next instruction following the original instruction in the original instruction stream.

14. The computer program product according to claim 8, wherein the operation further comprises:
calling the kernel breakpoint handler; and
modifying an instruction pointer via the kernel breakpoint handler such that the instruction pointer points to the trampoline.

15. A system comprising:
a processor; and
a memory storing instructions, which, when executed on the processor, perform an operation comprising:
obtaining address data of an original instruction in an original instruction stream;
obtaining kernel mode data comprising a kernel breakpoint handler;
obtaining user mode data comprising a user breakpoint handler;
creating a trampoline comprising a copy of the original instruction, a set of instructions for performing a call to the user breakpoint handler, a set of instructions for saving register states and stack data of the original instruction, and a set of instructions for restoring the register states and the stack data of the original instruction;
registering the kernel breakpoint handler to associate the trampoline with a breakpoint instruction;
replacing the original instruction with the breakpoint instruction;
detecting the breakpoint instruction; and
subsequent to detecting the breakpoint instruction, executing the trampoline by operation of one or more processors, wherein executing the trampoline comprises executing the original instruction.

16. The system according to claim 15, wherein the operation further comprises:
allocating a page of a process address space;
storing the trampoline in the page; and
copying the user breakpoint handler to the page.

17. The system according to claim 15, wherein the trampoline further comprises a set of instructions for performing a jump to a next instruction following the original instruction in the original instruction stream.

18. The system according to claim 15, wherein executing the trampoline further comprises at least one of saving the register states and the stack data of the original instruction and restoring the register states and the stack data of the original instruction.

19. The system according to claim 15, wherein executing the trampoline further comprises jumping to a next instruction following the original instruction in the original instruction stream.

20. The system according to claim 15, wherein the operation further comprises:
   calling the kernel breakpoint handler; and
   modifying an instruction pointer via the kernel breakpoint handler such that the instruction pointer points to the trampoline.

* * * * *